(12) United States Patent
Ahn et al.

(10) Patent No.: US 12,170,480 B2
(45) Date of Patent: Dec. 17, 2024

(54) CONTROLLER FOR MULTI-LEVEL CONVERTER AND POWER MANAGEMENT INTEGRATED CIRCUIT

(71) Applicant: LX Semicon Co., Ltd., Daejeon (KR)

(72) Inventors: Young Kook Ahn, Daejeon (KR); Tae Kyu Nam, Daejeon (KR); Won Suk Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 110 days.

(21) Appl. No.: 18/177,854

(22) Filed: Mar. 3, 2023

(65) Prior Publication Data

US 2024/0039403 A1 Feb. 1, 2024

(30) Foreign Application Priority Data

Aug. 1, 2022 (KR) .......................... 10-2022-0095191

(51) Int. Cl.
| | |
|---|---|
| H02M 3/157 | (2006.01) |
| H02M 1/00 | (2006.01) |
| H02M 1/08 | (2006.01) |
| H02M 3/156 | (2006.01) |
| H02M 3/158 | (2006.01) |

(52) U.S. Cl.
CPC ......... *H02M 3/157* (2013.01); *H02M 1/0019* (2021.05); *H02M 1/0095* (2021.05); *H02M 1/082* (2013.01); *H02M 3/156* (2013.01); *H02M 3/158* (2013.01); *H02M 3/1588* (2013.01)

(58) Field of Classification Search
CPC ...... H02M 3/156; H02M 3/157; H02M 3/158; H02M 3/1588
See application file for complete search history.

(56) References Cited

U.S. PATENT DOCUMENTS

| | | | |
|---|---|---|---|
| 6,989,999 B2 | 1/2006 | Muramatsu et al. | |
| 8,395,367 B2 * | 3/2013 | Chien | H02M 3/158 323/288 |
| 10,090,763 B1 * | 10/2018 | Mercer | H02M 3/1582 |
| 10,554,124 B1 * | 2/2020 | Mangudi | H02M 1/08 |
| 2010/0066328 A1 * | 3/2010 | Shimizu | H02M 3/1588 323/282 |
| 2010/0327836 A1 * | 12/2010 | Li | H02M 3/1588 323/283 |
| 2018/0019660 A1 * | 1/2018 | Jang | H02M 3/156 |
| 2018/0337599 A1 * | 11/2018 | Chen | H02M 3/158 |
| 2019/0058397 A1 * | 2/2019 | Lazaro | H02M 7/4837 |
| 2019/0305679 A1 * | 10/2019 | Jiang | H02M 3/158 |
| 2021/0159790 A1 * | 5/2021 | Tseng | H02M 3/158 |

* cited by examiner

*Primary Examiner* — Gary A Nash
(74) *Attorney, Agent, or Firm* — POLSINELLI PC

(57) ABSTRACT

A controller for a multi-level converter compares a first voltage proportional to an input voltage or an output voltage with a second voltage proportional to a voltage of a flying capacitor and adjusting a slope of a ramp signal for generating a pulse width modulation (PWM) signal so that the second voltage follows the first voltage in controlling the multi-level converter.

20 Claims, 18 Drawing Sheets

CONTROLLER FOR MULTI-LEVEL CONVERTER AND POWER MANAGEMENT INTEGRATED CIRCUIT

CROSS-REFERENCE TO RELATED APPLICATION

This application claims the priority of Korean Patent Application No. 10-2022-0095191, filed on Aug. 1, 2022, which is hereby incorporated by reference in its entirety.

BACKGROUND

Field of the Disclosure

The present disclosure relates to the control of a converter, and more particularly, to the control of a multi-level converter.

Description of the Background

Display devices include a power management circuit. The power management circuit is sometimes referred to as a power management integrated circuit, or PMIC for short.

The PMIC performs a function of converting system power supplied from a commercial power source or battery to match the characteristics of the components included in display devices and supply the converted power. For example, when a voltage of the system power is different from an operating voltage of the components, the PMIC converts the voltage of the system power and then supplies the converted voltage to the respective components.

A converter including a PMIC may be implemented in the form of a multi-level converter. The multi-level converter may lower the level of a voltage across an inductor by using a flying capacitor, and through this, the efficiency of power conversion may be increased.

Meanwhile, when the flying capacitor does not maintain a constant voltage level in the multi-level converter, the aforementioned efficiency advantages may disappear. Rather, as a swing level of the voltage supplied to the inductor increases, a voltage applied to a switch may increase to result in damage to the switch.

The discussions in this section are only to provide background information and do not constitute an admission of prior art.

SUMMARY

An aspect of the present disclosure is to provide a technology for maintaining a voltage of a flying capacitor at a constant level in a multi-level converter.

In an aspect of the present disclosure, a controller for a multi-level converter includes: an error signal generator generating an error signal according to a difference between a feedback voltage proportional to an output voltage of the multi-level converter including a plurality of switches and a reference voltage; a ramp signal generator generating a ramp signal; a ramp signal adjuster adjusting a slope of the ramp signal according to a difference between a first voltage proportional to the output voltage and a second voltage proportional to a voltage of a flying capacitor; and a pulse width modulation (PWM) signal generator generating a PWM signal for controlling a first switch among the plurality of switches by comparing a SAW signal generated based on the ramp signal with the error signal.

The plurality of switches may be connected in series, an inductor may be connected to a center node of the plurality of switches, and the flying capacitor may be connected in parallel to two switches adjacent to the center node.

In another aspect of the present disclosure, a power management integrated circuit includes: a first switch, a second switch, a third switch, and a fourth switch included in a multi-level converter and connected in series with each other; and a controller generating a first ramp signal, adjusting a slope of the first ramp signal according to a difference between a first voltage proportional to an output voltage of the multi-level converter and a second voltage proportional to a voltage of a flying capacitor, and generating a first pulse width modulation (PWM) signal for controlling the first switch according to a first SAW signal generated based on the first ramp signal.

The controller may generate a second ramp signal having a phase difference of 180 degrees from the first ramp signal, adjust a slope of the second ramp signal according to the difference between the first voltage and the second voltage, and generate a second PWM signal for controlling the second switch according to a second SAW signal generated based on the second ramp signal.

The controller may lower the slope of the first ramp signal and increase the slope of the second ramp signal when the first voltage is greater than the second voltage.

In another aspect of the present disclosure, a controller for a multi-level converter includes: an error signal generator generating an error signal according to a difference between a feedback voltage proportional to an output voltage of the multi-level converter including a plurality of switches and a reference voltage; a ramp signal generator generating a ramp signal; a ramp signal adjuster adjusting a slope of the ramp signal according to a difference between a first voltage proportional to an input voltage of the multi-level converter and a second voltage proportional to a voltage of a flying capacitor; and a pulse width modulation (PWM) signal generator generating a PWM signal for controlling a first switch among the plurality of switches by comparing a SAW signal generated based on the ramp signal with the error signal.

The plurality of switches may be connected in series, an inductor may be connected to a center node of the plurality of switches, the flying capacitor may be connected in parallel to two switches adjacent to the center node, a ground voltage may be supplied to one side of the plurality of switches, and the input voltage may be supplied to the other side of the plurality of switches.

The first voltage may be a voltage obtained by sensing the input voltage by 0.5 times, and the second voltage may be a voltage obtained by sensing a voltage of the flying capacitor by 1 time.

As described above, according to the present aspect, a voltage of a flying capacitor may be maintained at a constant level through a simple circuit. According to the present aspect, in the case of a 3-level boost converter, the voltage of the flying capacitor may be maintained at a level of ½ of an output voltage. Also, according to the present aspect, in the case of a 3-level buck converter, the voltage of the flying capacitor may be maintained at a level of ½ of an input voltage.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Meanwhile, when the flying capacitor does not maintain a constant voltage level in the multi-level converter, the above-described efficiency advantage may disappear. Rather, as the swing level of the voltage supplied to the inductor increases, the voltage applied to the switch increases, which may cause a problem in that the switch is destroyed.

Figure 1:
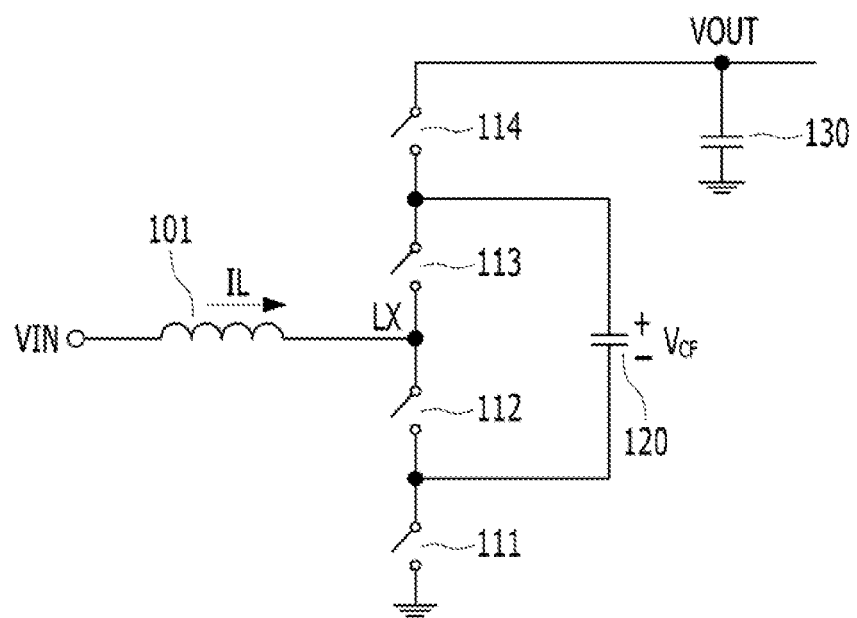
FIG. 1 is a block diagram of a 3-level boost converter.

FIG. 1 is a block diagram of a 3-level boost converter.

Referring to FIG. 1, the 3-level boost converter may include four switches 111, 112, 113, and 114 connected in series, a flying capacitor 120, an output capacitor 130, and an inductor 101.

One side of the inductor 101 may be connected to an input voltage VIN, and the other side of the inductor 101 may be connected to a center node of the four switches 111, 112, 113 and 114. Here, the node (the center node) to which the inductor 101 is connected is also referred to as an inductor node. Hereinafter, for convenience of description, the corresponding node is referred to as an inductor node.

The first switch 111 may be located between a negative terminal of the flying capacitor 120 and a ground, and the second switch 112 may be located between the inductor node and the negative terminal of the flying capacitor 120. In addition, the third switch 113 may be located between the positive terminal of the flying capacitor 120 and the inductor node, and the fourth switch 114 may be located between the output capacitor 130 and the positive terminal of the flying capacitor 120. According to this arrangement, the flying capacitor 120 is connected in parallel with the second switch 112 and the third switch 113.

The input voltage VIN may be supplied to one side of the inductor 101, and a voltage LX of the inductor node may be supplied to the other side of the inductor 101.

According to the control of the switches 111, 112, 113, and 114, the inductor node voltage LX may be four types of voltages. When the first switch 111 and the second switch 112 are turned on and the third switch 113 and the fourth switch 114 are turned off, the inductor node voltage LX may be a ground voltage (a first type voltage). Also, when the first switch 111 and the third switch 113 are turned on and the second switch 112 and the fourth switch 114 are turned off, the inductor node voltage LX may be a flying capacitor voltage ($V_{CF}$, a second type voltage). Also, when the second switch 112 and the fourth switch 114 are turned on and the first switch 111 and the third switch 113 are turned off, the inductor node voltage LX may be a voltage (VOUT-$V_{CF}$, a third type voltage) obtained by subtracting the flying capacitor voltage from the output voltage. Also, when the third switch 113 and the fourth switch 114 are turned on and the first switch 111 and the second switch 112 are turned off, the inductor node voltage LX may be an output voltage VOUT.

The 3-level boost converter may control the switches 111, 112, 113, and 114 so that 3 types of voltages, among the above 4 types of voltages, appear at the inductor node according to the ratio of the output voltage to the input voltage. For example, the 3-level boost converter may control the switches 111, 112, 113, and 114 such that the first type voltage, the second type voltage, and the third type voltage appear at the inductor node. Also, as another example, the 3-level boost converter may control the switches 111, 112, 113, and 114 such that the second type voltage, the third type voltage, and the fourth type voltage appear at the inductor node.

Meanwhile, the second type voltage and the third type voltage may have substantially similar voltage levels. For example, if the flying capacitor voltage $V_{CF}$ is ½ of the output voltage VOUT, both the second type voltage and the third type voltage may be VOUT/2. In this case, in the 3-level boost converter, substantially only two voltage levels may appear at the inductor node, and the inductor current IL may be controlled in a balanced manner. However, if the second type voltage and the third type voltage have much different voltage levels, the voltage LX of the inductor node may swing significantly, so that the balance of the inductor current IL may be broken and the efficiency of power conversion may also deteriorate.

Figure 2:
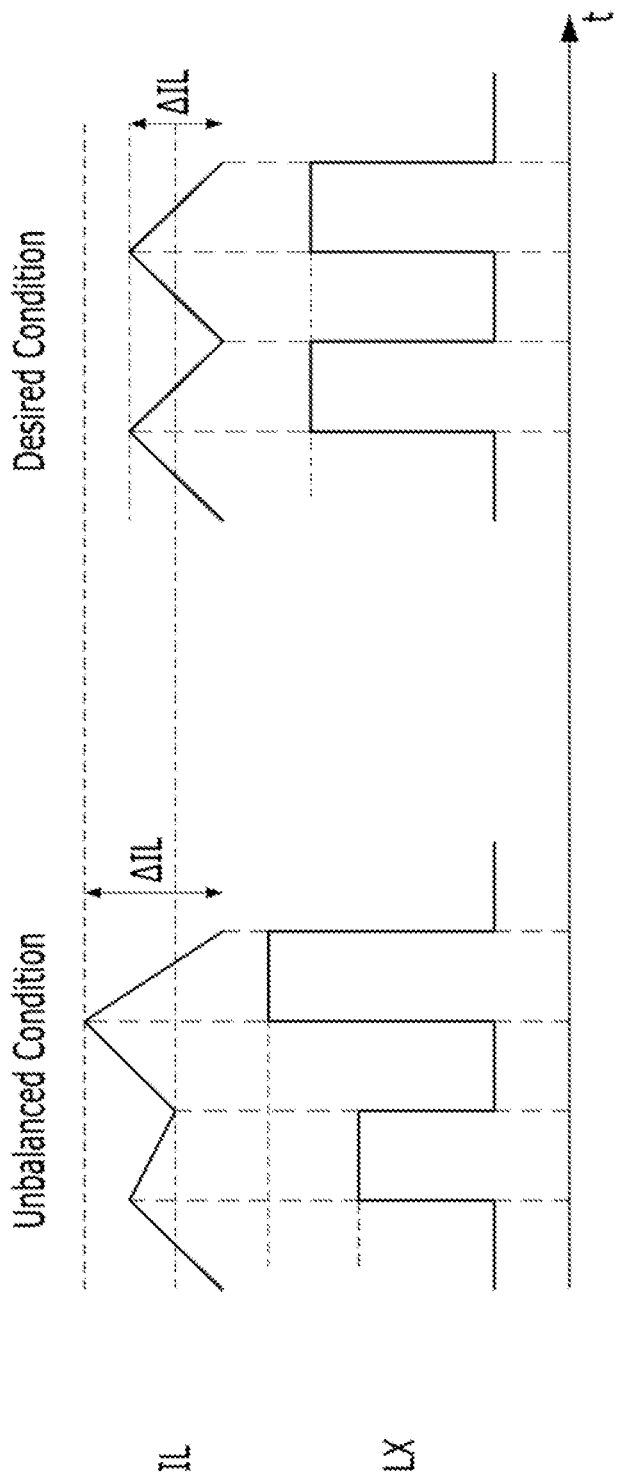
FIG. 2 is a view showing waveforms of an inductor current and a voltage of an inductor node in a 3-level boost converter.

FIG. 2 is a view showing waveforms of an inductor current and a voltage of an inductor node in a 3-level boost converter.

The waveform shown on the left in FIG. 2 is a waveform when the flying capacitor voltage fails to maintain ½ of the output voltage so that the second type voltage and the third type voltage have much different voltage levels, and the waveform shown on the right in FIG. 2 is a waveform when the flying capacitor voltage maintains ½ of the output voltage so that the second type voltage and the third type voltage have substantially similar voltage levels.

Referring to FIG. 2, it may be seen that, when the flying capacitor voltage does not maintain ½ of the output voltage, a fluctuation range of the inductor node voltage LX and the inductor current IL increases. When the fluctuation range of the inductor node voltage LX and the inductor current IL increases, the power conversion efficiency may decrease and a voltage applied to the switch may increase, which may cause damage to the switch.

To solve this problem, the multi-level converter according to an aspect provides a technology for sensing a voltage level of the flying capacitor and adjusting a control duty for each switch according to the voltage level of the flying capacitor.

Figure 3:
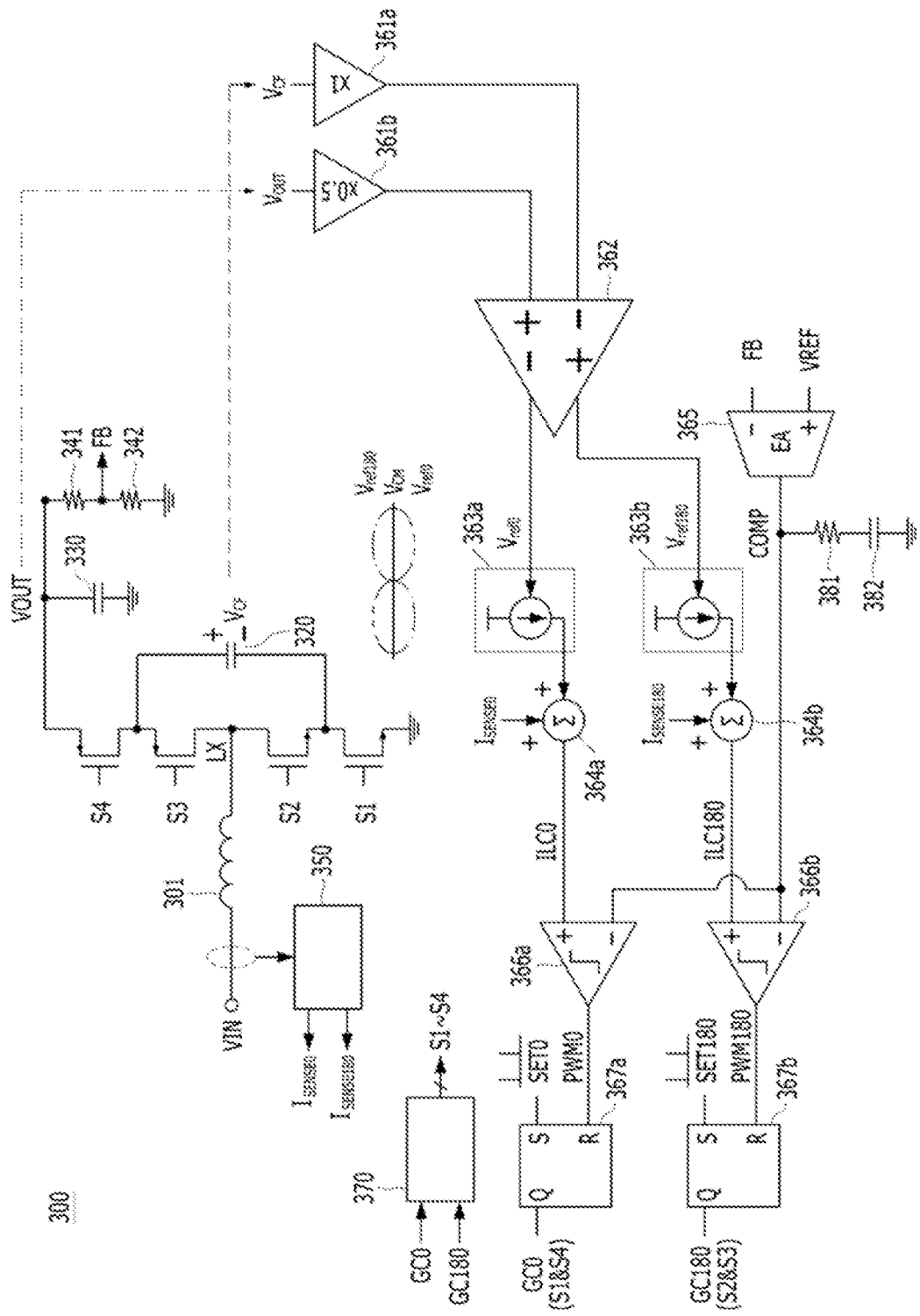
FIG. 3 is a block diagram of a multi-level converter according to an aspect.
Figure 4A:
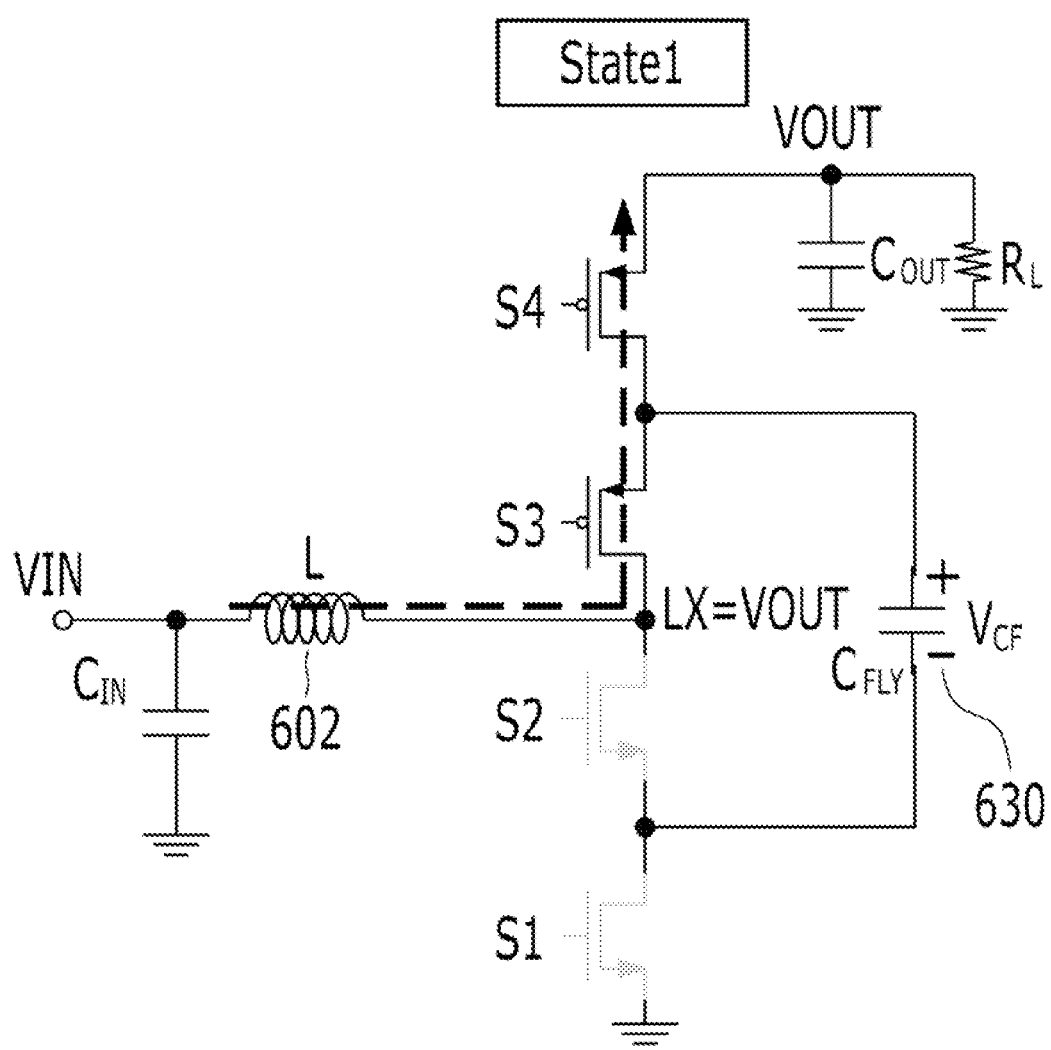
FIGS. 4A, 4B, 4C, and 4D are views illustrating a first example operation of a multi-level converter according to an aspect.
Figure 4B:
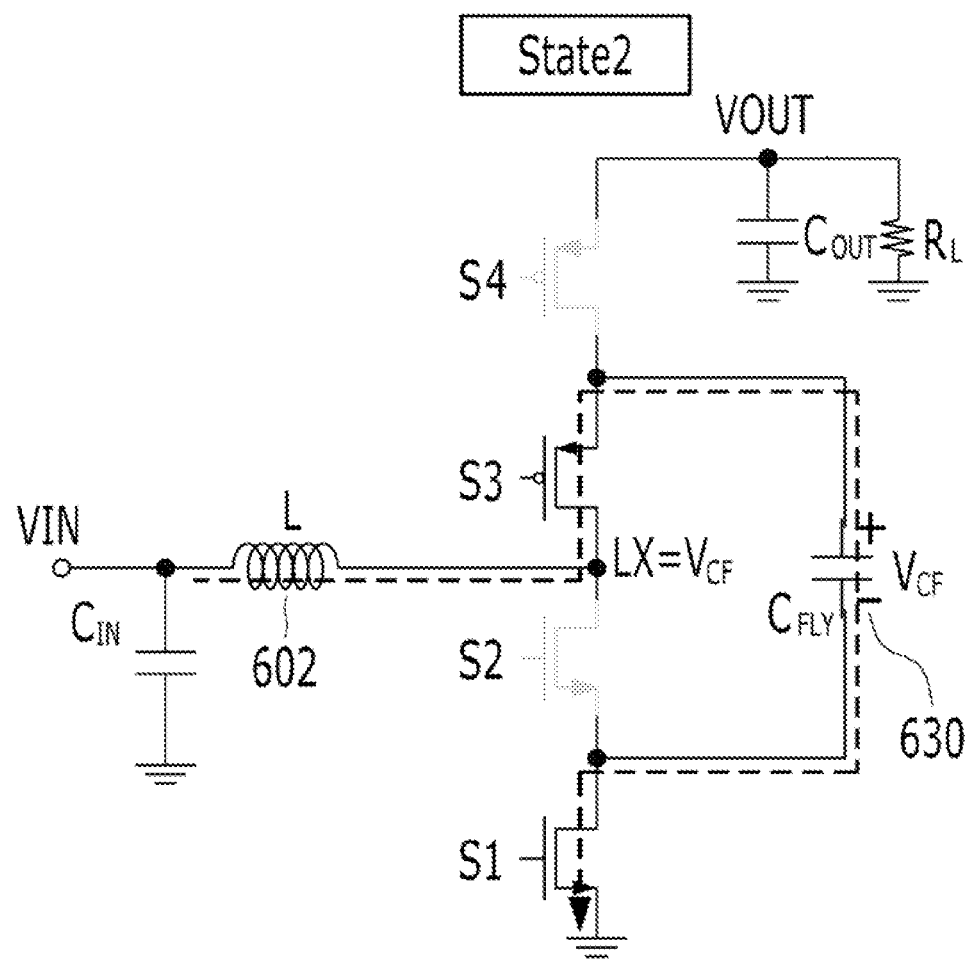
Figure 4C:
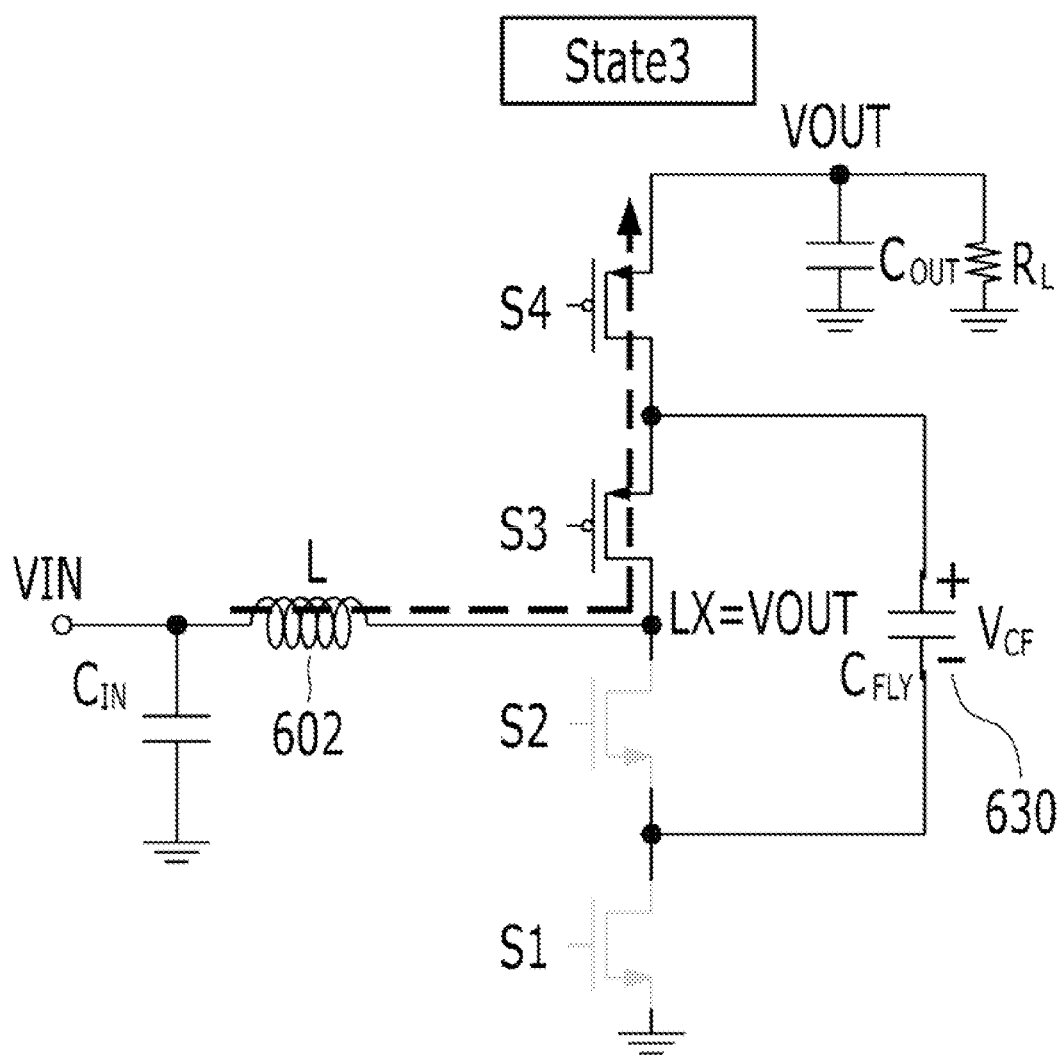
Figure 4D:
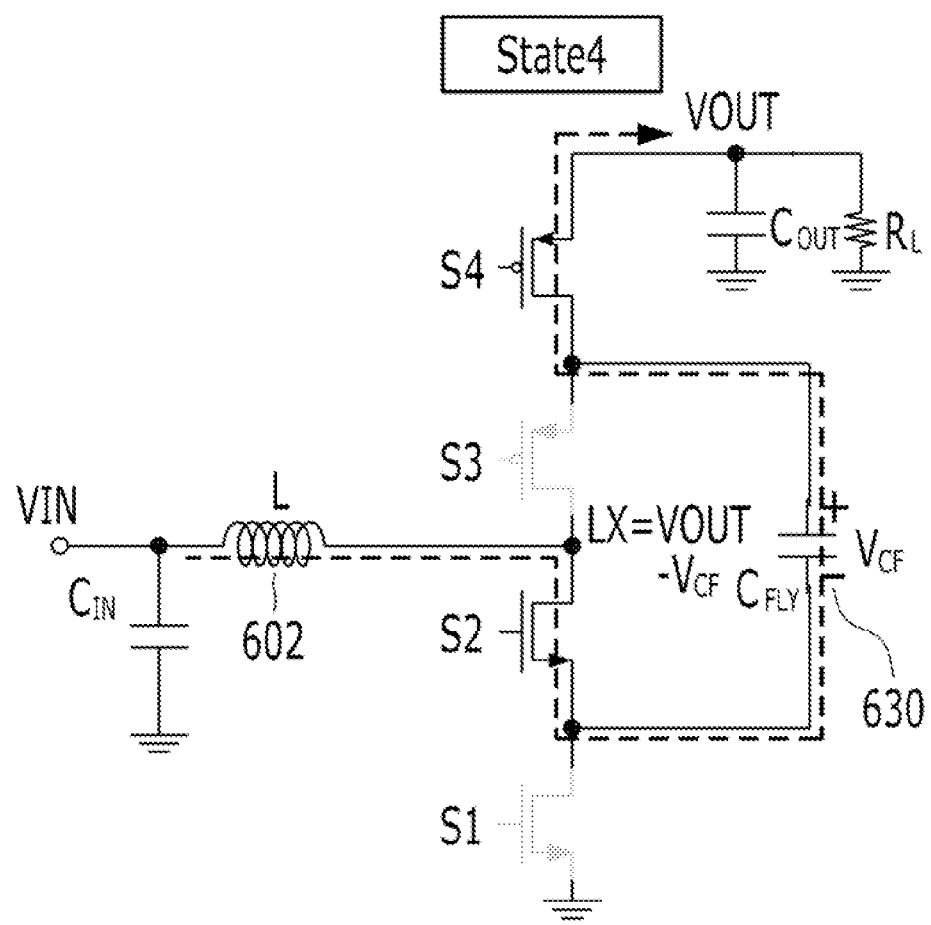

FIG. 3 is a block diagram of a multi-level converter according to an aspect.

Referring to FIG. 3, the multi-level converter 300 may include a power stage and a controller.

The power stage is a circuit in which relatively large power is processed, and may include an inductor 301, a plurality of switches S1, S2, S3, and S4, a flying capacitor 320, an output capacitor 330, and the like. A controller is a circuit in which signals of relatively small power are processed, and parts other than the aforementioned power stage may correspond to the controller. The plurality of switches S1, S2, S3, and S4 and the controller may be implemented as a single integrated circuit (IC). Such an IC is also referred to as a power management integrated circuit (PMIC).

The plurality of switches S1, S2, S3, and S4 may be connected in series. A second switch S2 may be connected in series to a first switch S1, a third switch S3 may be connected in series to the second switch S2, and a fourth switch S4 may be connected in series to the third switch S3.

When a contact node of the second switch S2 and the third switch S3 is referred to as an inductor node, one side of the inductor 301 may be connected to the input voltage VIN, and the other side of the inductor 301 may be connected to the inductor node.

The first switch S1 may be located between a negative terminal of the flying capacitor 320 and the ground. In addition, the second switch S2 may be located between the inductor node and the negative terminal of the flying capacitor 320. In addition, the third switch S3 may be located between a positive terminal of the flying capacitor 320 and the inductor node. In addition, the fourth switch S4 may be located between the output capacitor 330, in which the output voltage VOUT is formed, and the positive terminal of the flying capacitor 320. According to this arrangement, the flying capacitor 320 is connected in parallel with the second switch S2 and the third switch S3.

The controller may include a plurality of sensors.

The controller may include a current sensor 350 sensing the inductor current IL. The current sensor 350 may sense the inductor current IL and generate a first current sensing signal $I_{SENSE0}$ corresponding to the inductor current IL. In addition, the current sensor 350 may generate a second current sensing signal $I_{SENSE180}$ having a phase difference of 180 degrees from the first current sensing signal $I_{SENSE0}$.

The controller may sense the output voltage VOUT using a plurality of resistors. For example, the controller may sense the output voltage VOUT using a first feedback resistor 341 and a second feedback resistor 342 and generate a feedback voltage FB proportional to the output voltage VOUT.

The controller may include voltage sensors. Among the voltage sensors, a first voltage sensor 361b may sense the output voltage VOUT at a ratio of 0.5 to generate a first voltage. In addition, a second voltage sensor 361a, among the voltage sensors, may generate a second voltage by sensing a voltage $V_{CF}$ of the flying capacitor at a ratio of 1 time.

The controller may include an error signal generator 365. The error signal generator 365 may generate an error signal COMP according to a difference between the feedback voltage FB and a reference voltage VREF. The feedback voltage FB may be input to a negative input terminal of the error signal generator 365 and the reference voltage VREF may be input to a positive input terminal. Since the error signal generator 365 includes an error amplifier, a signal proportional to a difference between the reference voltage VREF and the feedback voltage FB may be output as an error signal COMP.

A compensation circuit may be connected to an output terminal of the error signal generator 365, and the compensation circuit may include a compensation resistor 381, a compensation capacitor 382, and the like, and a loop gain of a control loop may be determined according to a magnitude of impedance of the compensation resistor 381 and the compensation capacitor 382.

The controller may include a first SAW signal generator and a second SAW signal generator.

The first SAW signal generator may generate a first SAW (SAW) signal ILC0, and may include a first ramp signal generator 363a and a first signal synthesizer 364a. The second SAW signal generator may generate a second SAW signal ILC180 and may include a second ramp signal generator 363b and a second signal synthesizer 364b.

The first ramp signal generator 363a may generate a first ramp signal. The first ramp signal may be a signal that gradually increases with the passage of time within one period. The first SAW signal generator may generate the first SAW signal ILC0 based on the first ramp signal.

The first signal synthesizer 364a may generate the first SAW signal ILC0 by synthesizing the first ramp signal and the first current sensing signal $I_{SENSE0}$.

The second ramp signal generator 363b may generate a second ramp signal. The second ramp signal may be a signal that gradually increases with the passage of time within one period, and may have a phase difference of 180 degrees from the first ramp signal. The second SAW signal generator may generate the second SAW signal ILC180 based on the second ramp signal.

The second signal synthesizer 364b may generate the second SAW signal ILC180 by synthesizing the second ramp signal and the second current sensing signal $I_{SENSE180}$.

The controller may include a first pulse width modulation (PWM) signal generator 366a and a second PWM signal generator 366b.

The first PWM signal generator 366a may generate a first PWM signal PWM0 by comparing the error signal COMP with the first SAW signal ILC0. The second PWM signal generator 366b may generate a second PWM signal PWM180 by comparing the error signal COMP with the second SAW signal ILC180.

The controller may include a gate controller.

The gate controller may generate gate signals GC0 and GC180 according to the PWM signals PWM0 and PWM180 and transmit the gate signals GC0 and GC180 to gates of the switches.

The gate controller may include a first gate signal generator 367a, a second gate signal generator 367b, and a PWM controller 370.

The first gate signal generator 367a may form a rising edge of the first gate signal GC0 according to a first set signal SET0 and may form a falling edge of the first gate signal GC0 according to a rising edge of the first PWM signal PWM0.

The second gate signal generator 367b may form a rising edge of the second gate signal GC180 according to a second set signal SET180, and form a falling edge of the second gate signal GC180 according to a rising edge of the second PWM signal PWM180. The second set signal SET180 may have a phase difference of 180 degrees from the first set signal SET0.

The PWM controller 370 may transmit the first gate signal GC0 to a gate of the first switch S1 to control ON/OFF of the first switch S1. In addition, the PWM controller 370 may control the fourth switch S4 according to an inverted signal of the first PWM signal PWM0, and in terms of signal, the PWM controller 370 may transmit an inverted signal of the first gate signal GC0 to a gate of the fourth switch S4 to control ON/OFF of the fourth switch S4.

The PWM controller 370 may transmit the second gate signal GC180 to a gate of the second switch S2 to control ON/OFF of the second switch S2. In addition, the PWM controller 370 may control the third switch S3 according to an inverted signal of the second PWM signal PWM180, and in terms of signal, the PWM controller 370 may transmit an inverted signal of the second gate signal GC180 to a gate of the third switch to control ON/OFF of the third switch.

The controller may include a ramp signal adjuster 362.

The ramp signal adjuster 362 may adjust slopes of the first ramp signal and the second ramp signal according to a difference between the first voltage proportional to the output voltage VOUT and the second voltage proportional to the voltage $V_{CF}$ of the flying capacitor.

The ramp signal adjuster 362 may generate a first control signal Vref0 and a second control signal $V_{ref180}$ according to the difference between the first voltage and the second voltage.

The first control signal $V_{ref0}$ may be transmitted to the first ramp signal generator 363a, and the first ramp signal generator 363a may adjust the slope of the first ramp signal according to the first control signal $V_{ref0}$. The second control signal $V_{ref180}$ may be transmitted to the second ramp signal generator 363b, and the second ramp signal generator 363b may adjust the slope of the second ramp signal according to the second control signal $V_{ref180}$. The first ramp signal generator 363a and the second ramp signal generator 363b include a capacitor and a current source, and may integrate a current transmitted from the current source into the capacitor to generate the first ramp signal and the second ramp signal. In this structure, the first ramp signal generator 363a and the second ramp signal generator 363b may adjust the slopes of the first ramp signal and the second ramp signal by adjusting the amount of current generated by the current source.

Figure 5:
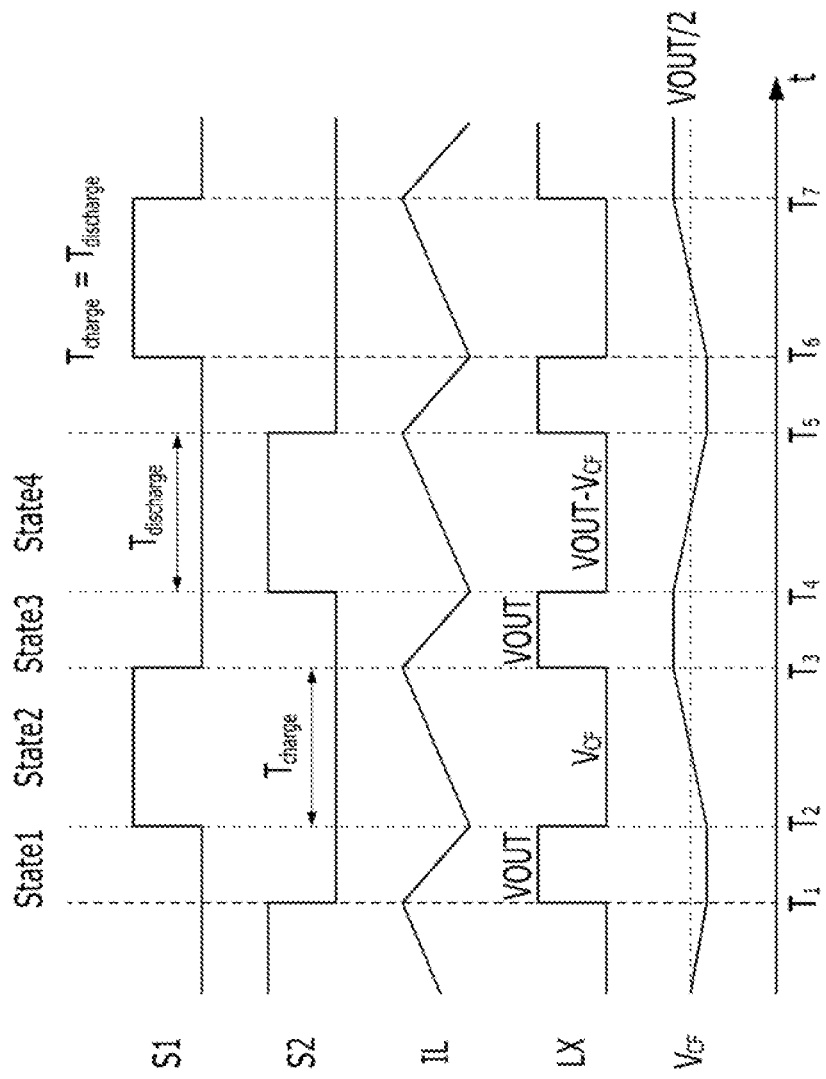
FIG. 5 is a view showing main waveforms of the multi-level converter in the first example operation.

FIGS. 4A, 4B, 4C, and 4D are views illustrating a first example operation of the multi-level converter according to an aspect, and FIG. 5 is a view illustrating main waveforms of the multi-level converter in the first example operation.

The multi-level converter may perform an operation such as in a first example when a control duty of the 3-level boost type converter is less than 0.5.

In the first example, the multi-level converter sequentially performs the operations of a first state, a second state, a third state, and a fourth state. In addition, the operations of the first state, the second state, the third state, and the fourth state are repeatedly performed every cycle.

In the first state, the third switch S3 and the fourth switch S4 may be turned on, and the first switch S1 and the second switch S2 may be turned off. The first switch S1 and the fourth switch S4 may operate opposite to each other, and the second switch S2 and the third switch S3 may operate opposite to each other.

In the first state, the inductor node voltage LX may be equal to the output voltage VOUT, and as the input voltage VIN and the output voltage VOUT are supplied across the inductor 602, the inductor current IL may decrease. Also, since the flying capacitor 630 is in a floating state, the voltage $V_{CF}$ of the flying capacitor may not change.

In the second state, the first switch S1 and the third switch S3 may be turned on, and the second switch S2 and the fourth switch S4 may be turned off.

In the second state, the inductor node voltage LX may be equal to the voltage $V_{CF}$ of the flying capacitor, and as the input voltage VIN and the voltage $V_{CF}$ of the flying capacitor are supplied across the inductor 602, the inductor current IL may increase. In addition, as the inductor current IL flows to a positive terminal of the flying capacitor 630, the flying capacitor 630 may be charged and the voltage $V_{CF}$ of the flying capacitor may increase. This time period is also referred to as a flying capacitor charge period $T_{charge}$.

In the third state, the third switch S3 and the fourth switch S4 may be turned on, and the first switch S1 and the second switch S2 may be turned off.

In the third state, the inductor node voltage LX may be equal to the output voltage VOUT, and as the input voltage VIN and the output voltage VOUT are supplied across the inductor 602, the inductor current IL may decrease. Also, since the flying capacitor 630 is in a floating state, the voltage $V_{CF}$ of the flying capacitor may not change.

In the fourth state, the second switch S2 and the fourth switch S4 may be turned on, and the first switch S1 and the third switch S3 may be turned off.

In the fourth state, the inductor node voltage LX may be equal to a voltage (VOUT-$V_{CF}$) obtained by subtracting the voltage $V_{CF}$ of the flying capacitor from the output voltage VOUT, and as the input voltage VIN and the VOUT-$V_{CF}$ voltage is supplied across the inductor 602, the inductor current IL may increase. In addition, as the inductor current IL flows to a negative terminal of the flying capacitor 630, the flying capacitor 630 may be discharged and the voltage $V_{CF}$ of the flying capacitor may decrease. This time period is also referred to as a flying capacitor discharge period $T_{discharge}$Tdischarge.

When the inductor node voltage LX has substantially the same value in the second state and the fourth state, the multi-level converter may operate in a balanced manner in one cycle. This may be the case when the voltage $V_{CF}$ of the flying capacitor is ½ of the output voltage VOUT in the first example. In addition, when the lengths of the flying capacitor charge period $T_{charge}$Tcharge and the flying capacitor discharge period $T_{discharge}$ are equal, the voltage $V_{CF}$ of the flying capacitor may be maintained at a constant level. However, this balance point may be broken by various factors. For example, if the lengths of the flying capacitor charge period $T_{charge}$ and the flying capacitor discharge period $T_{discharge}$ are different, the balance point may be broken. In addition, if a magnitude of the inductor current for charging and discharging the flying capacitor in the second state and the fourth state is different, the balance point may be broken.

When the balance point is broken, the multi-level converter according to an aspect may adjust the slope of the ramp signal for restoration.

Figure 6:
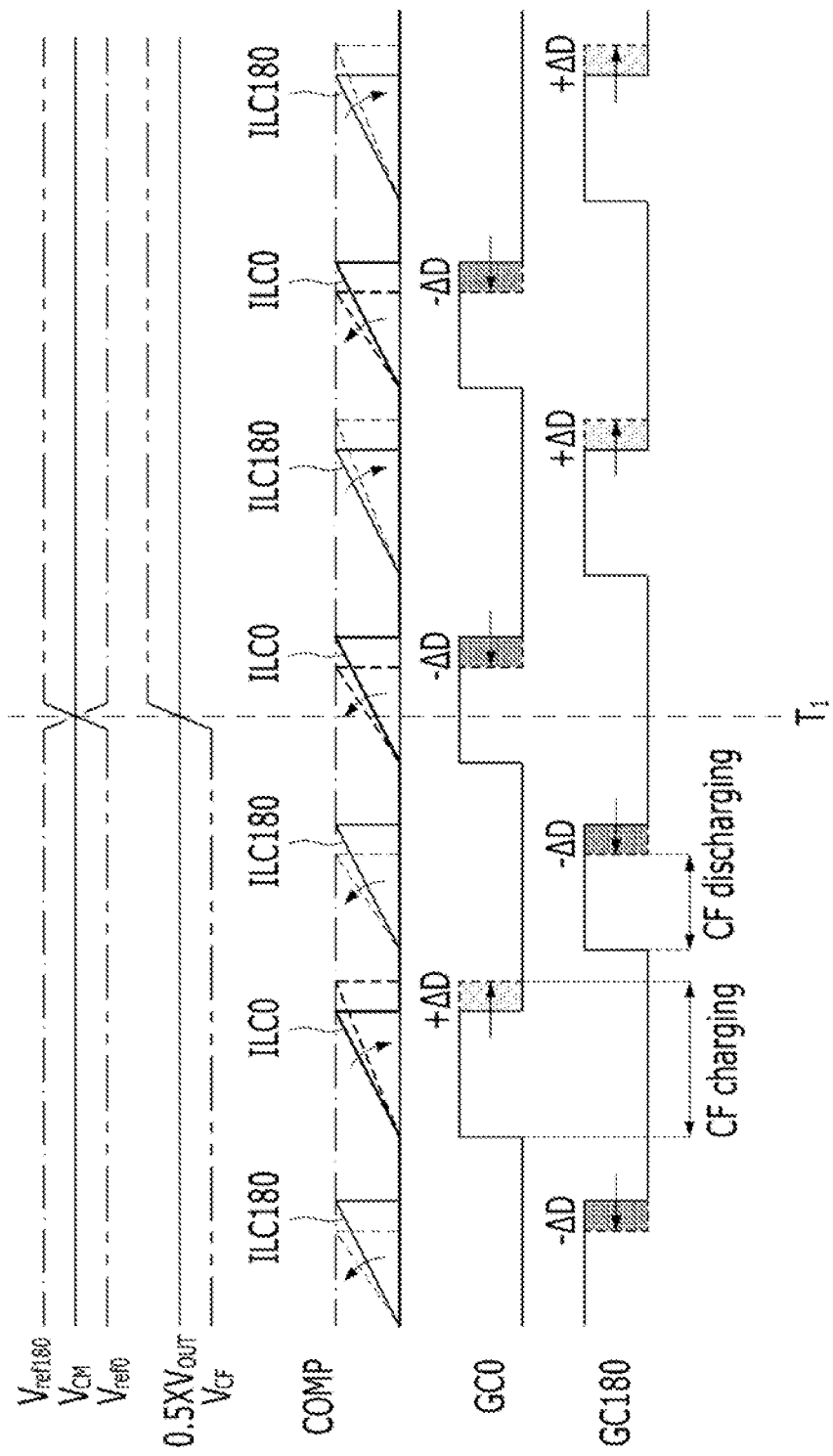
FIG. 6 is a view illustrating a process of finding a balance point in the first example operation.
Figure 7A:
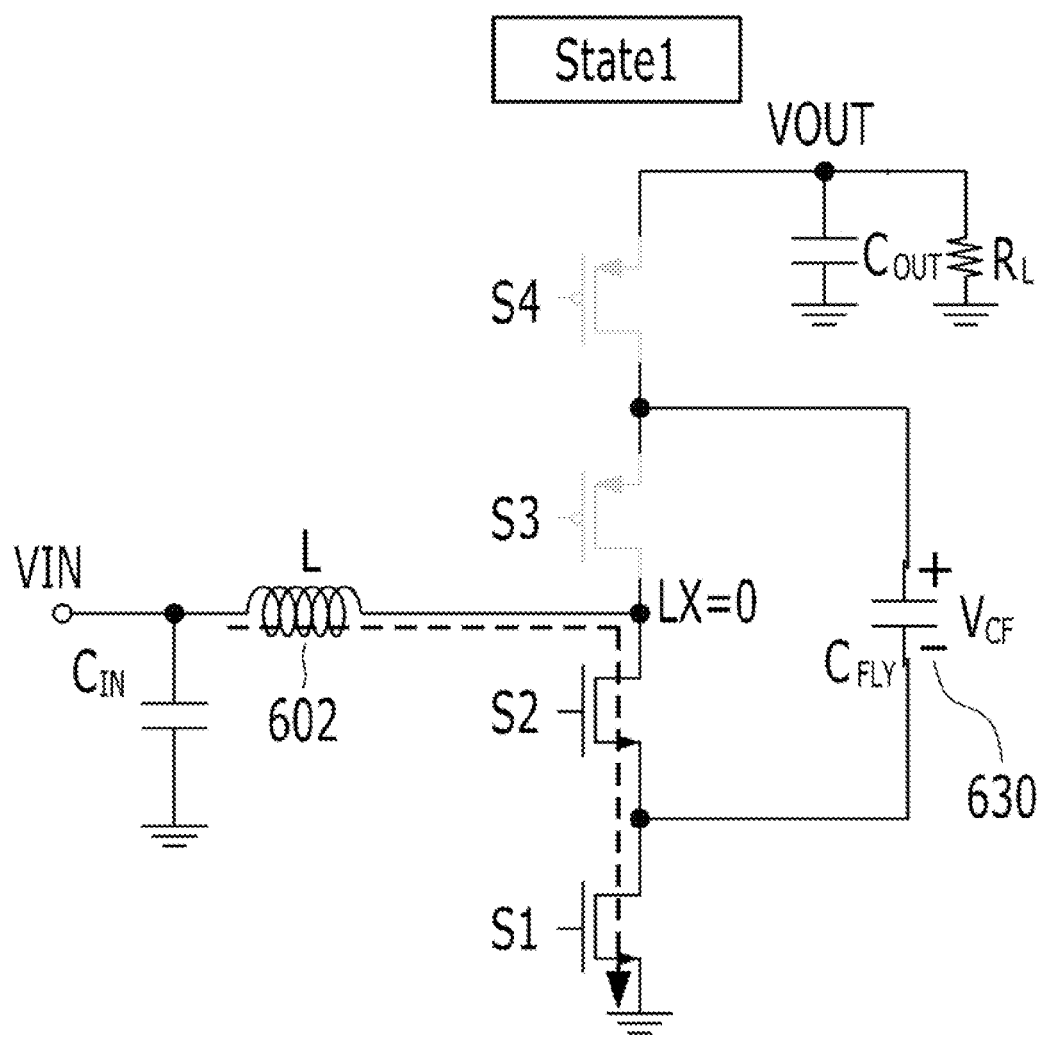
FIGS. 7A, 7B, 7C, and 7D are views illustrating a second example operation of a multi-level converter according to an aspect.
Figure 7B:
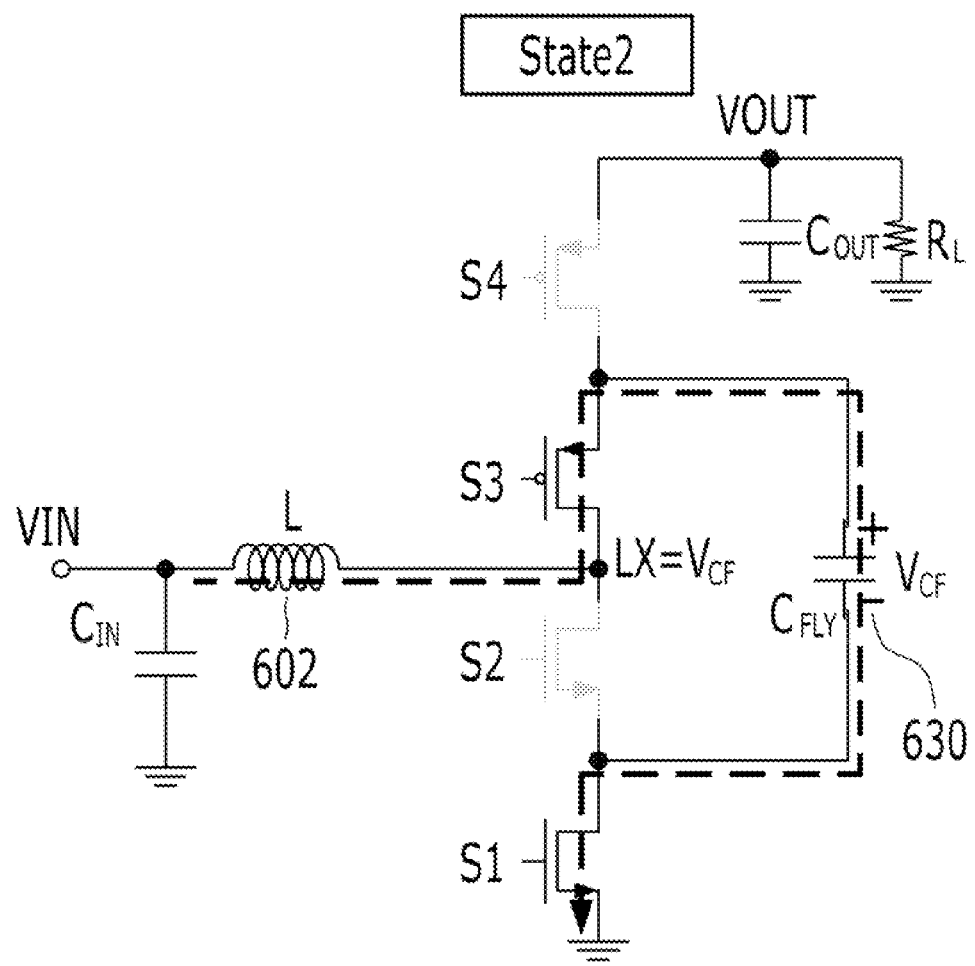
Figure 7C:
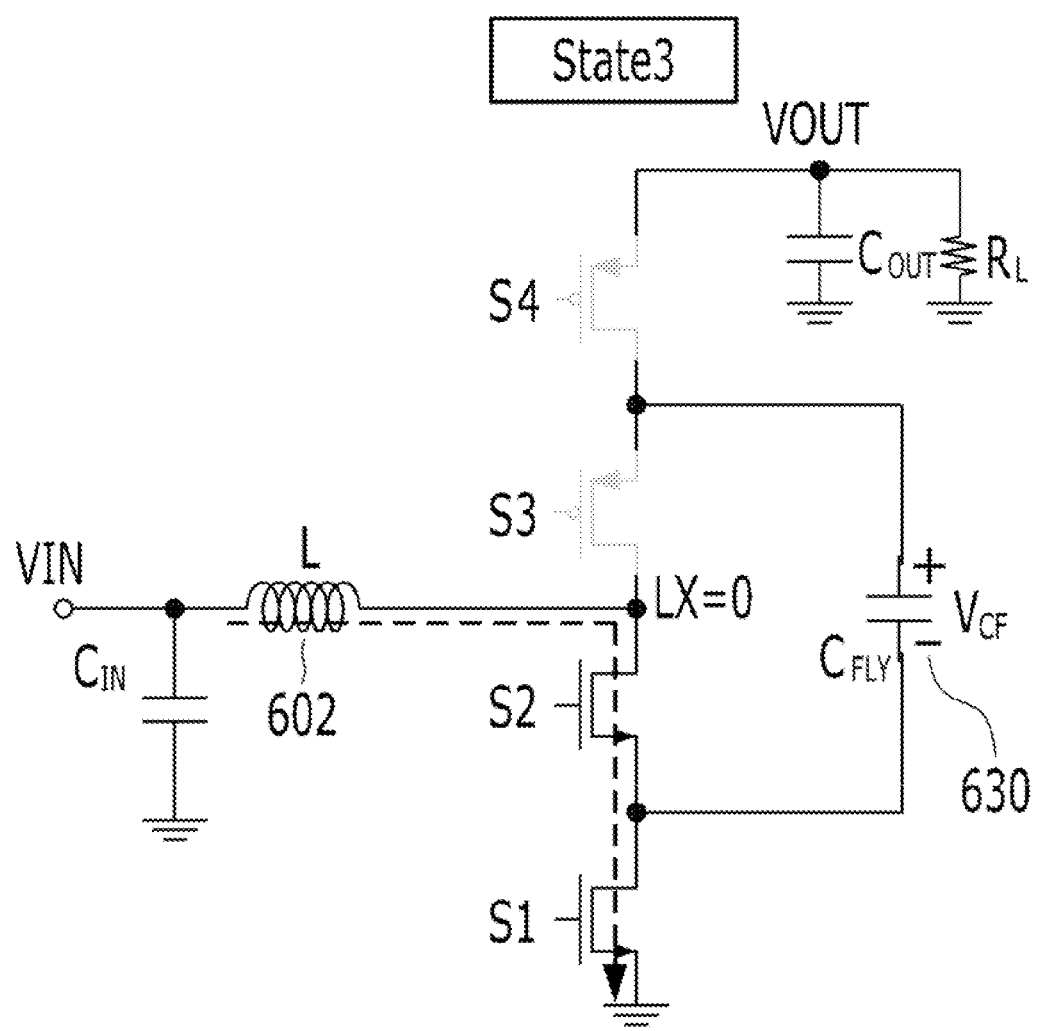
Figure 7D:
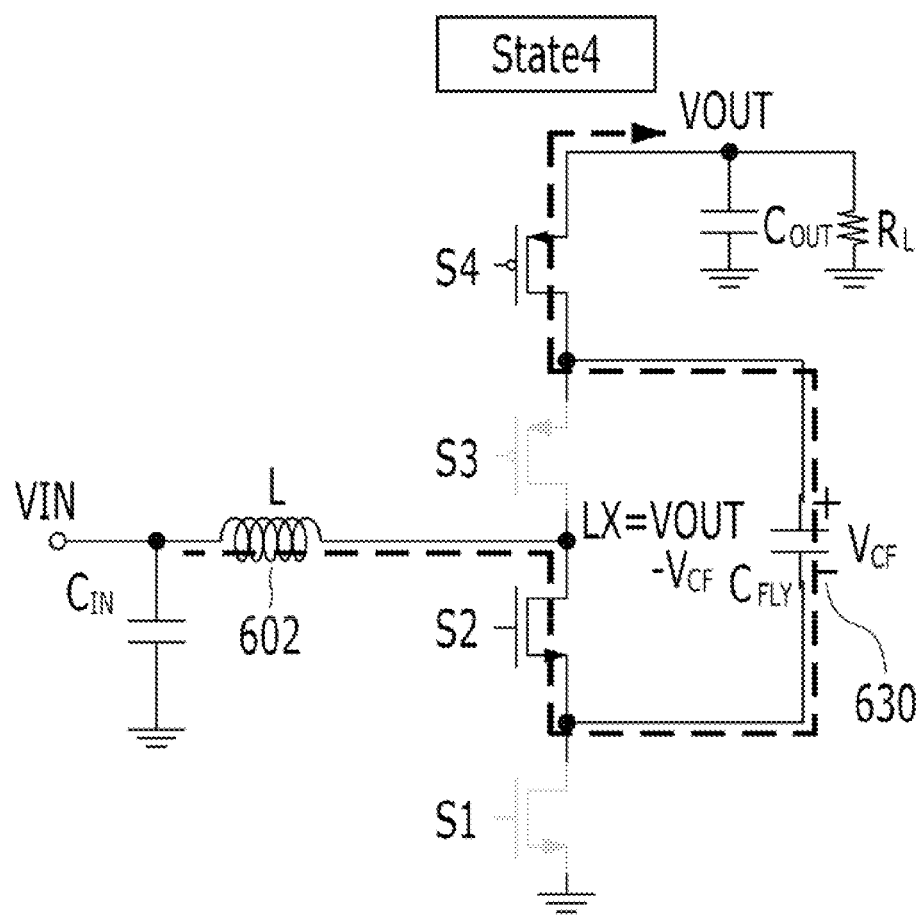

FIG. 6 is a view illustrating a process of finding a balance point in the first example operation.

In FIG. 6, before a first time point T1, the voltage $V_{CF}$ of the flying capacitor is lower than ½ of the output voltage (0.5×VOUT), and after the first time point T1, the voltage $V_{CF}$ of the flying capacitor is higher than ½ of the output voltage (0.5×VOUT).

Referring to FIG. 6, when the voltage $V_{CF}$ of the flying capacitor is lower than ½ of the output voltage (0.5×VOUT), the first control signal $V_{ref0}$ may have a level lower than that of a reference voltage $V_{CM}$. In addition, the slope of the first ramp signal controlled according to the first control signal $V_{ref0}$ may be lowered. In FIG. 6, the first SAW signal ILC0 generated according to the first ramp signal is illustrated, and it may be seen that the slope of the first SAW signal ILC0 decreases before the first time point T1. As the slope of the first SAW signal ILC0 is lowered, a control duty of the first gate signal GC0 is increased, and accordingly, a charge period of the flying capacitor may be lengthened and the voltage $V_{CF}$ of the flying capacitor may be further increased.

Referring to FIG. 6, when the voltage $V_{CF}$ of the flying capacitor is lower than ½ of the output voltage (0.5× VOUT), the second control signal $V_{ref180}$ may have a level higher than the reference voltage $V_{CM}$. In addition, the slope of the second ramp signal controlled according to the second control signal $V_{ref180}$ may be increased. In FIG. 6, the second SAW signal ILC180 generated according to the second ramp signal is illustrated, and it may be seen that the slope of the second SAW signal ILC180 increases before the first time point T1. As the slope of the second SAW signal ILC180 increases, the control duty of the second gate signal GC180 may decrease, and accordingly, the discharge period of the flying capacitor may be shortened and the voltage $V_{CF}$ of the flying capacitor may decrease less.

Referring to FIG. 6, when the voltage $V_{CF}$ of the flying capacitor is higher than ½ of the output voltage (0.5× VOUT), the first control signal $V_{ref0}$ may have a level higher than the reference voltage $V_{CM}$. In addition, the slope of the first ramp signal controlled according to the first control signal $V_{ref0}$ may be increased. In FIG. 6, the first SAW signal ILC0 generated according to the first ramp signal is illustrated, and it may be seen that the slope of the first SAW signal ILC0 increases after the first time point T1. As the slope of the first SAW signal ILC0 increases, the control duty of the first gate signal GC0 may decrease, and accordingly, the charge period of the flying capacitor may be shortened and the voltage $V_{CF}$ of the flying capacitor may increase less.

Referring to FIG. 6, when the voltage $V_{CF}$ of the flying capacitor is higher than ½ of the output voltage (0.5× VOUT), the second control signal $V_{ref180}$ may have a level lower than the reference voltage $V_{CM}$. In addition, the slope of the second ramp signal controlled according to the second control signal $V_{ref180}$ may be lowered. In FIG. 6, the second SAW signal ILC180 generated according to the second ramp signal is illustrated, and it may be seen that the slope of the second SAW signal ILC180 decreases after the first time point T1. As the slope of the second SAW signal ILC180 decreases, the control duty of the second gate signal GC180 increases, and accordingly, the discharge period of the flying capacitor may be lengthened and the voltage $V_{CF}$ of the flying capacitor may decrease further.

Through this process, the voltage $V_{CF}$ of the flying capacitor may be maintained at ½ (0.5×VOUT) level of the output voltage.

Figure 8:
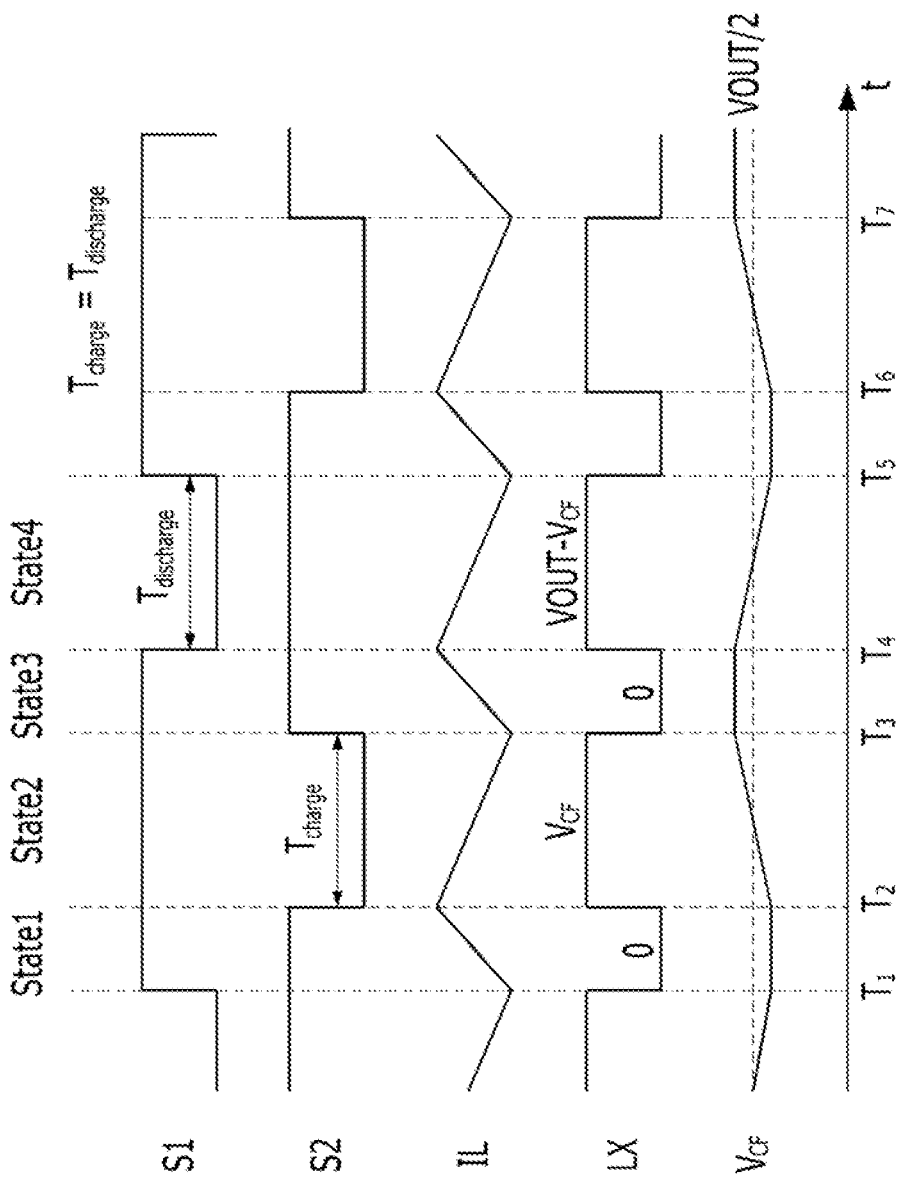
FIG. 8 is a view showing main waveforms of the multi-level converter in the second example operation.

FIGS. 7A, 7B, 7C, and 7D are views illustrating a second example operation of a multi-level converter according to an aspect, and FIG. 8 is a view illustrating main waveforms of the multi-level converter in the second example operation.

The multi-level converter may perform an operation such as in the second example when the control duty is greater than 0.5 in the 3-level boost type converter.

In the second example, the multi-level converter sequentially performs the operations of a first state, a second state, a third state, and a fourth state. In addition, the operations of the first state, the second state, the third state, and the fourth state are repeatedly performed every cycle.

In the first state, the first switch S1 and the second switch S2 may be turned on, and the third switch S3 and the fourth switch S4 may be turned off. The first switch S1 and the fourth switch S4 may operate opposite to each other, and the second switch S2 and the third switch S3 may operate opposite to each other.

In the first state, the inductor node voltage LX may be equal to the ground voltage, and the inductor current IL may increase as the input voltage VIN and the ground voltage are supplied across the inductor 602. Also, since the flying capacitor 630 is in a floating state, the voltage $V_{CF}$ of the flying capacitor may not change.

In the second state, the first switch S1 and the third switch S3 may be turned on, and the second switch S2 and the fourth switch S4 may be turned off.

In the second state, the inductor node voltage LX may be equal to the voltage $V_{CF}$ of the flying capacitor, and as the input voltage VIN and the voltage $V_{CF}$ of the flying capacitor are supplied across the inductor 602, the inductor current IL may decrease. In addition, as the inductor current IL flows to the positive terminal of the flying capacitor 630, the flying capacitor 630 may be charged and the voltage $V_{CF}$ of the flying capacitor may increase. This time period is also referred to as the flying capacitor charge period $T_{charge}$.

In the third state, the first switch S1 and the second switch S2 may be turned on, and the third switch S3 and the fourth switch S4 may be turned off.

In the third state, the inductor node voltage LX may be equal to the ground voltage, and as the input voltage VIN and the ground voltage are supplied across the inductor 602, the inductor current IL may increase. Also, since the flying capacitor 630 is in a floating state, the voltage $V_{CF}$ of the flying capacitor may not change.

In the fourth state, the second switch S2 and the fourth switch S4 may be turned on, and the first switch S1 and the third switch S3 may be turned off.

In the fourth state, the inductor node voltage LX may be equal to the voltage (VOUT-$V_{CF}$) obtained by subtracting the voltage $V_{CF}$ of the flying capacitor from the output voltage VOUT, and as the input voltage VIN and the VOUT-$V_{CF}$ voltage are supplied across the inductor 602, the inductor current IL may decrease. In addition, as the inductor current IL flows to the negative terminal of the flying capacitor 630, the flying capacitor 630 may be discharged and the voltage $V_{CF}$ of the flying capacitor may decrease. This time period is also referred to as a flying capacitor discharge period $T_{discharge}$.

When the inductor node voltage LX has substantially the same value in the second state and the fourth state, the multi-level converter may operate in a balanced manner in one cycle. This may be the case when the voltage $V_{CF}$ of the flying capacitor is ½ of the output voltage VOUT in the second example. In addition, when the lengths of the flying capacitor charge period $T_{charge}$ and the flying capacitor discharge period $T_{discharge}$ are equal, the voltage $V_{CF}$ of the flying capacitor may be maintained at a constant level. However, this balance point may be broken by various factors. For example, if the lengths of the flying capacitor charge period $T_{charge}$ and the flying capacitor discharge period $T_{discharge}$ are different, the balance point may be broken. In addition, if a magnitude of the inductor current for charging and discharging the flying capacitor in the second state and the fourth state is different, the balance point may be broken.

When the balance point is broken, the multi-level converter according to an aspect may adjust the slope of the ramp signal for restoration.

Figure 9:
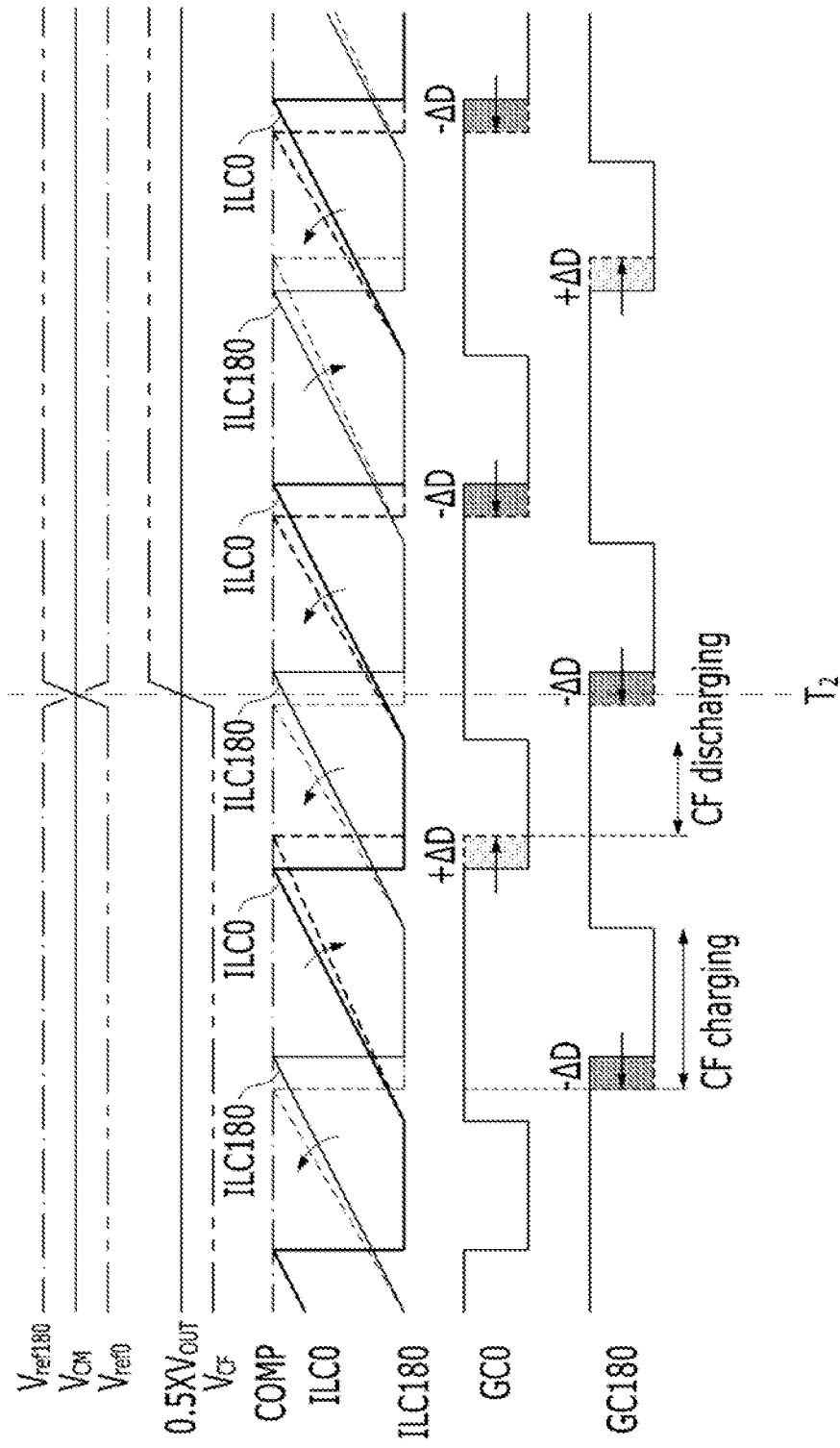
FIG. 9 is a view illustrating a process of finding a balance point in the second example operation.

FIG. 9 is a view illustrating a process of finding a balance point in the second example operation.

In FIG. 9, before a second time point T2, the voltage $V_{CF}$ of the flying capacitor is lower than ½ of the output voltage (0.5×VOUT), and after the second time point T2, the voltage $V_{CF}$ of the flying capacitor is higher than ½ of the output voltage (0.5×VOUT).

Referring to FIG. 9, when the voltage $V_{CF}$ of the flying capacitor is lower than ½ of the output voltage (0.5×VOUT), the first control signal $V_{ref0}$Vref0 may have a level lower than that of a reference voltage $V_{CM}$. In addition, the slope of the first ramp signal controlled according to the first control signal $V_{ref0}$ may be lowered. In FIG. 9, the first SAW signal ILC0 generated according to the first ramp signal is illustrated, and it may be seen that the slope of the first SAW signal ILC0 decreases before the second time point T2. As the slope of the first SAW signal ILC0 is lowered, a control duty of the first gate signal GC0 is increased, and accordingly, a discharge period of the flying capacitor may be shortened and the voltage $V_{CF}$ of the flying capacitor may be decreased less.

Referring to FIG. 9, when the voltage $V_{CF}$ of the flying capacitor is lower than ½ of the output voltage (0.5×VOUT), the second control signal $V_{ref180}$ may have a level higher than the reference voltage $V_{CM}$. In addition, the slope of the second ramp signal controlled according to the second control signal $V_{ref180}$ may be increased. In FIG. 9, the second SAW signal ILC180 generated according to the second ramp signal is illustrated, and it may be seen that the slope of the second SAW signal ILC180 increases before the second time point T2. As the slope of the second SAW signal ILC180 increases, the control duty of the second gate signal GC180 may decrease, and accordingly, the charge period of the flying capacitor may be lengthened and the voltage $V_{CF}$ of the flying capacitor may increase further.

Referring to FIG. 9, when the voltage $V_{CF}$ of the flying capacitor is higher than ½ of the output voltage (0.5×VOUT), the first control signal $V_{ref0}$ may have a level higher than the reference voltage $V_{CM}$. In addition, the slope of the first ramp signal controlled according to the first control signal $V_{ref0}$ may be increased. In FIG. 9, the first SAW signal ILC0 generated according to the first ramp signal is illustrated, and it may be seen that the slope of the first SAW signal ILC0 increases after the second time point T2. As the slope of the first SAW signal ILC0 increases, the control duty of the first gate signal GC0 may decrease, and accordingly, the discharge period of the flying capacitor may be lengthened and the voltage $V_{CF}$ of the flying capacitor may decrease further.

Referring to FIG. 9, when the voltage $V_{CF}$ of the flying capacitor is higher than ½ of the output voltage (0.5×VOUT), the second control signal $V_{ref180}$ may have a level lower than the reference voltage $V_{CM}$. In addition, the slope of the second ramp signal controlled according to the second control signal $V_{ref180}$ may be lowered. In FIG. 9, the second SAW signal ILC180 generated according to the second ramp signal is illustrated, and it may be seen that the slope of the second SAW signal ILC180 decreases after the second time point T2. As the slope of the second SAW signal ILC180 decreases, the control duty of the second gate signal GC180 increases, and accordingly, the charge period of the flying capacitor may be shortened and the voltage $V_{CF}$ of the flying capacitor may increase less.

Through this process, the voltage $V_{CF}$ of the flying capacitor may be maintained at ½ (0.5×VOUT) level of the output voltage.

The concept of the present aspect may also be applied to a case in which the multi-level converter is voltage-controlled, as well as to a case in which the multi-level converter is current-controlled.

Figure 10:
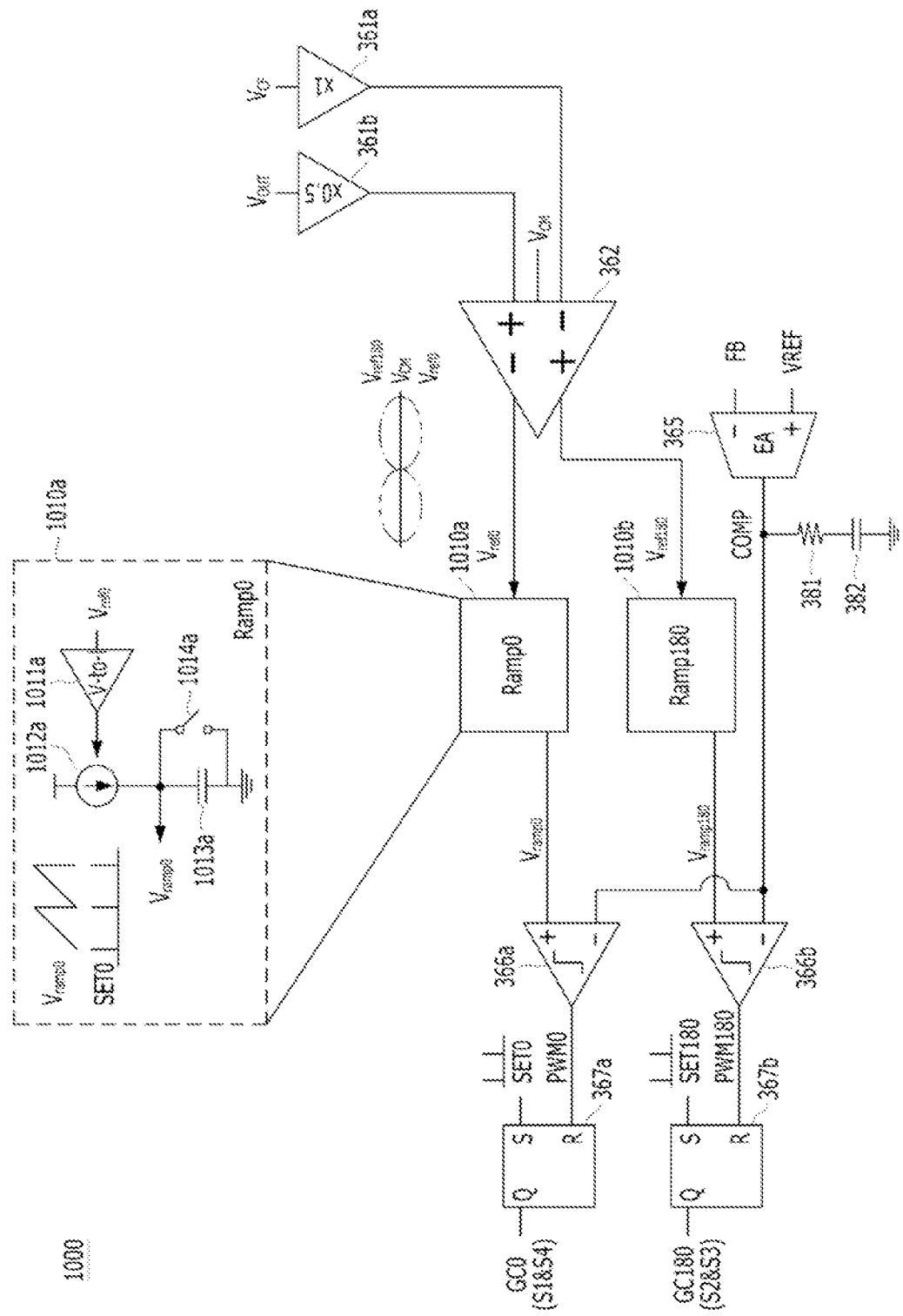
FIG. 10 is a configuration view of a controller for a voltage-controlled multi-level converter.

FIG. 10 is a configuration view of a controller of a voltage-controlled multi-level converter.

Referring to FIG. 10, the multi-level converter controller 1000 may include a plurality of sensors 361a and 361b, a first ramp signal generator 1010a, a second ramp signal generator 1010b, an error signal generator 365, a first PWM signal generator 366a, a second PWM signal generator 366b, a first gate signal generator 367a, a second gate signal generator 367b, a PWM controller, and a ramp signal adjuster 362. The components described above with reference to FIG. 3 will be omitted, and hereinafter, the first ramp signal generator 1010a and the second ramp signal generator 1010b will be mainly described.

The first ramp signal generator 1010a may generate a first ramp signal $V_{ramp0}$. The first ramp signal $V_{ramp0}$ may be a signal that gradually increases with the passage of time within one period. Also, the second ramp signal generator 1010b may generate a second ramp signal $V_{ramp180}$. The second ramp signal $V_{ramp180}$ may be a signal that gradually increases with the passage of time within one period, and may have a phase difference of 180 degrees from the first ramp signal $V_{ramp0}$.

In the aspect illustrated in FIG. 10, the first ramp signal $V_{ramp0}$ may be the same as the first SAW signal, and the second ramp signal $V_{ramp180}$ may be the same as the second SAW signal.

The first ramp signal generator 1010a and the second ramp signal generator 1010b may include a capacitor and a current source.

For example, the first ramp signal generator 1010a may include a first capacitor 1013a and a first current source 1012a. A reset switch 1014a may be located in parallel with the first capacitor 1013a. The reset switch 1014a may be turned on according to a first set signal SET0 to reset a voltage of the first capacitor 1013a. The first capacitor 1013a may be charged by a current output from the first current source 1012a, and a voltage thereof may be constantly increased in the form of integration.

The first control signal $V_{ref0}$ output from the ramp signal adjuster 362 may be converted into a current in a first voltage-to-current converter 1011a and then transferred to a first current source 1012a. In addition, the first current source 1012a may adjust the slope of the first ramp signal $V_{ramp0}$, while adjusting a magnitude of the current output according to the first control signal $V_{ref0}$.

Although not shown in the drawings, the second ramp signal generator 1010b may also include substantially the same configuration and may operate substantially in the same manner.

Figure 11:
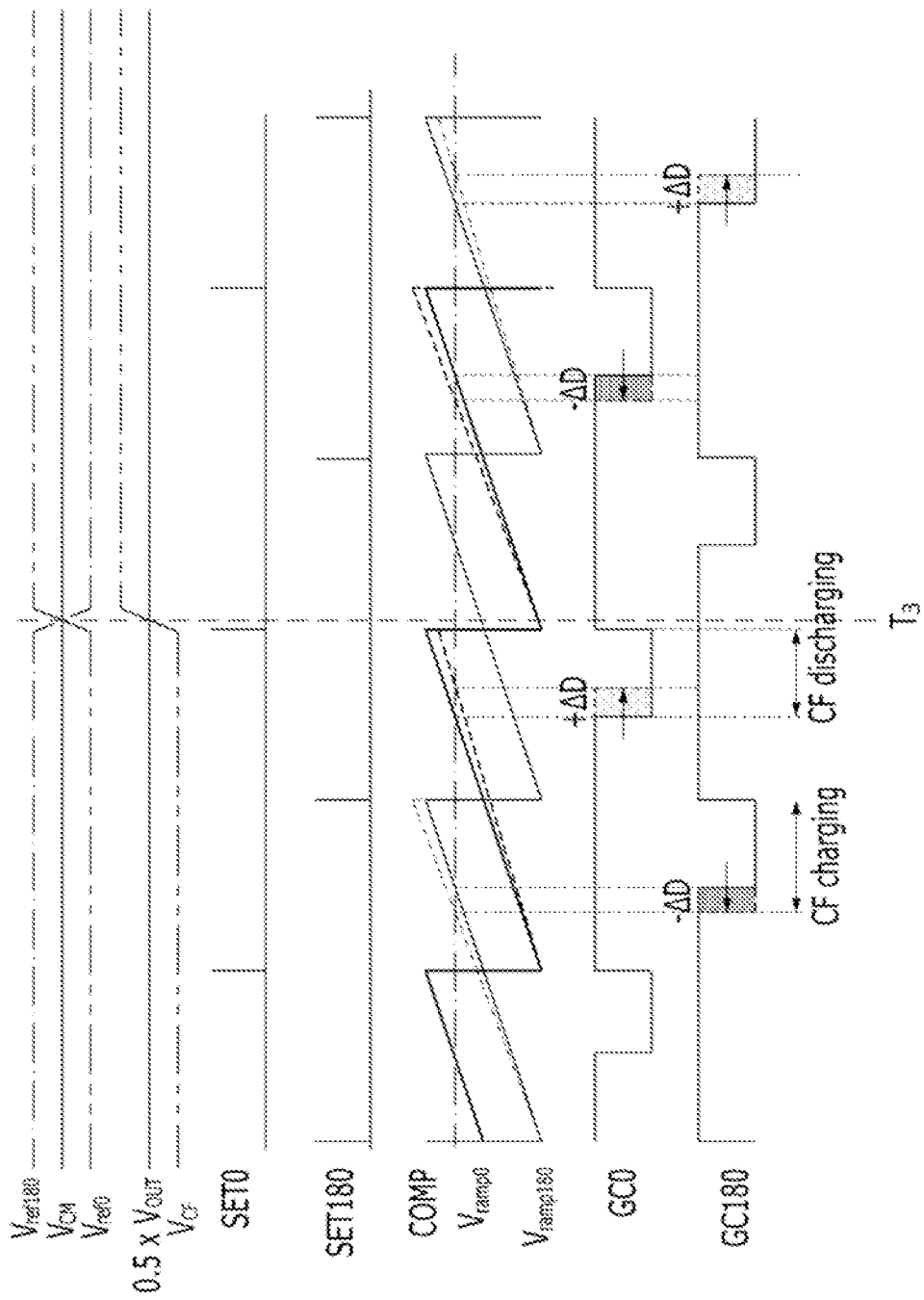
FIG. 11 is a view illustrating a process in which the multi-level converter finds a balance point in the example of FIG. 10.

FIG. 11 is a view illustrating a process in which the multi-level converter finds a balance point in the example of FIG. 10.

Referring to FIG. 11, before a third time point T3, the voltage $V_{CF}$ of the flying capacitor is lower than ½ of the output voltage (0.5×VOUT), and after the third time point T3, the voltage of the flying capacitor $V_{CF}$ is higher than ½ of the output voltage (0.5×VOUT).

Referring to FIG. 11, when the voltage $V_{CF}$ of the flying capacitor is lower than ½ of the output voltage (0.5×VOUT), the first control signal $V_{ref0}$ may have a level lower than the reference voltage $C_{CM}$. In addition, the slope of the first ramp signal $V_{ramp0}$ controlled according to the first control signal $V_{ref0}$ may be lowered. In FIG. 11, it may be seen that the slope of the first ramp signal $V_{ramp0}$ decreases before the third time point T3. As the slope of the first ramp signal $V_{ramp0}$ is lowered, the control duty of the first gate signal GC0 is increased, and accordingly, the discharge period of the flying capacitor may be shortened and the voltage $V_{CF}$ of the flying capacitor may decrease less.

Referring to FIG. 11, when the voltage $V_{CF}$ of the flying capacitor is lower than ½ of the output voltage (0.5× VOUT), the second control signal $V_{ref180}$ may have a level higher than the reference voltage $V_{CM}$. In addition, the slope of the second ramp signal $V_{ramp180}$ controlled according to the second control signal $V_{ref180}$ may be increased. In FIG. 11, it may be seen that the slope of the second ramp signal $V_{ramp180}$ increases before the third time point T3. As the slope of the second ramp signal $V_{ramp180}$ increases, the control duty of the second gate signal GC180 may decrease, and accordingly, the charge period of the flying capacitor may be lengthened and the voltage $V_{CF}$ of the flying capacitor may increase further.

Referring to FIG. 11, when the voltage $V_{CF}$ of the flying capacitor is higher than ½ of the output voltage (0.5× VOUT), the first control signal $V_{ref0}$ may have a level higher than the reference voltage $V_{CM}$. In addition, the slope of the first ramp signal $V_{ramp0}$ controlled according to the first control signal $V_{ref0}$ may be increased. In FIG. 11, as the slope of the first ramp signal $V_{ramp0}$ increases after the third time point T3, the control duty of the first gate signal GC0 decreases, and accordingly, the discharge period of the flying capacitor may be lengthened and the voltage $V_{CF}$ of the flying capacitor may decrease further.

Referring to FIG. 11, when the voltage $V_{CF}$ of the flying capacitor is higher than ½ of the output voltage (0.5× VOUT), the second control signal $V_{ref180}$ may have a level lower than the reference voltage $V_{CM}$. In addition, the slope of the second ramp signal $V_{ramp180}$ controlled according to the second control signal $V_{ref180}$ may be lowered. In FIG. 11, after the third time point T3, as the slope of the second ramp signal $V_{ramp180}$ decreases, the control duty of the second gate signal GC180 increases, and accordingly, the charge period of the flying capacitor may be shortened and the voltage $V_{CF}$ of the flying capacitor may increase less.

Through this process, the voltage $V_{CF}$ of the flying capacitor may be maintained at ½ (0.5×VOUT) level of the output voltage.

Meanwhile, for convenience of description, an aspect has been described above based on the boost converter as an example. However, in an aspect, the concept of maintaining the voltage of the flying capacitor at a constant level by adjusting the slope of the ramp signal may also be applied to other types of converters, such as a buck converter.

Figure 12:
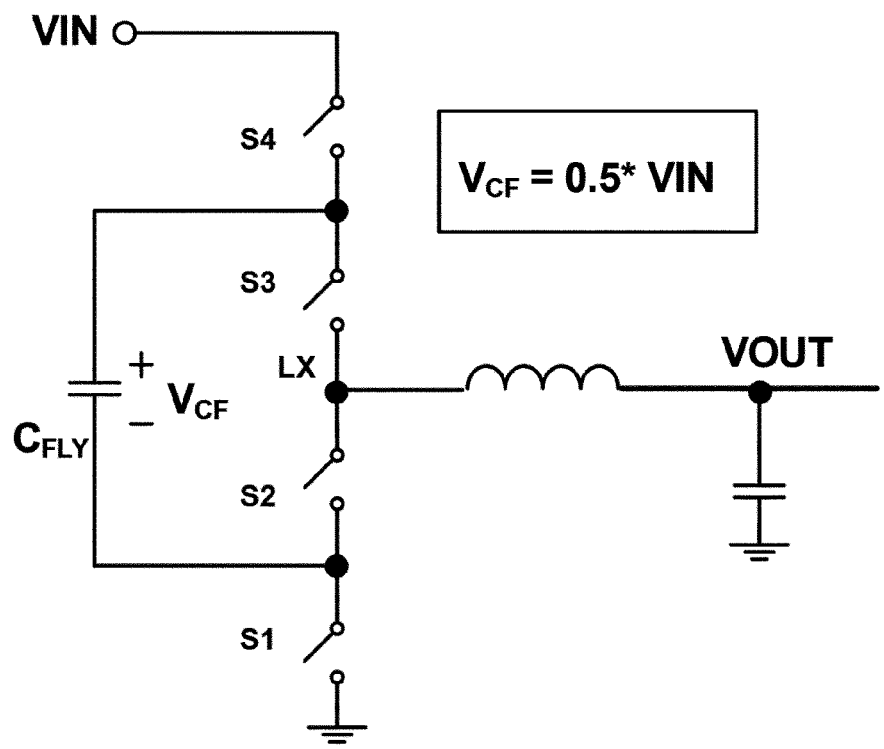
FIG. 12 is a block diagram of a 3-level buck converter.

FIG. 12 is a block diagram of a 3-level buck converter.

Referring to FIG. 12, the 3-level buck converter may include four switches S1, S2, S3, and S4 connected in series, a flying capacitor $C_{FLY}$, an output capacitor, an inductor, and the like.

One side of the inductor may be connected to the output voltage VOUT, and the other side of the inductor may be connected to the center node of the four switches S1, S2, S3, and S4. Here, the node (the center node) to which the inductor is connected is also referred to as an inductor node.

The first switch S1 may be located between a negative terminal of the flying capacitor $C_{FLY}$ and the ground, and the second switch S2 may be located between the inductor node and the negative terminal of the flying capacitor $C_{FLY}$. Also, the third switch S3 may be located between a positive terminal of the flying capacitor $C_{FLY}$ and the inductor node, and the fourth switch S4 may be located between the input voltage VIN terminal and the positive terminal of the flying capacitor $C_{FLY}$. According to this arrangement, the flying capacitor $C_{FLY}$ is connected in parallel with the second switch S2 and the third switch S3.

The controller of the 3-level buck converter may include an error signal generator, a ramp signal generator, a ramp signal adjuster, a PWM signal generator, and the like.

The error signal generator may generate an error signal according to a difference between a feedback voltage proportional to the output voltage VOUT and a reference voltage.

In addition, the ramp signal generator may generate a ramp signal, and the ramp signal adjuster may adjust a slope of the ramp signal according to a difference between a first voltage proportional to the input voltage VIN, e.g., a voltage obtained by sensing the input voltage by 0.5 times, and a second voltage proportional to the voltage $V_{CF}$ of the flying capacitor, e.g., a voltage obtained by sensing the voltage of the flying capacitor by 1 time. There is a difference from the aforementioned embodiments in that the ramp signal adjuster adjusts the slope of the ramp signal by comparing the input voltage VIN, not the output voltage, with the voltage $V_{CF}$ of the flying capacitor.

In the buck converter method, unlike the boost converter method, the voltage $V_{CF}$ of the flying capacitor should maintain ½ of the input voltage VIN or another voltage proportional to the input voltage VIN to maintain the balance. Accordingly, the ramp signal adjuster maintains the voltage $V_{CF}$ of the flying capacitor at a constant level by adjusting the slope of the ramp signal according to the difference between the input voltage VIN and the flying capacitor voltage $V_{CF}$.

As described above, according to the present aspect, the voltage of the flying capacitor may be maintained at a constant level through a simple circuit. According to the present aspect, in the case of the 3-level boost converter, the voltage of the flying capacitor may be maintained at a level of ½ of the output voltage. And, according to the present aspect, in the case of the 3-level buck converter, the voltage of the flying capacitor may be maintained at a level of ½ of the input voltage.

It will be apparent to those skilled in the art that various modifications and variations can be made in the controller for multi-level converter and power management integrated circuit of the present disclosure without departing from the spirit or scope of the aspects. Thus, it is intended that the present disclosure covers the modifications and variations of the aspects provided they come within the scope of the appended claims and their equivalents.

What is claimed is:

1. A controller for a multi-level converter, comprising:
    an error signal generator generating an error signal according to a difference between a feedback voltage proportional to an output voltage of the multi-level converter including a plurality of switches and a reference voltage;
    a ramp signal generator generating a ramp signal;
    a ramp signal adjuster adjusting a slope of the ramp signal according to a difference between a first voltage proportional to the output voltage and a second voltage proportional to a voltage of a flying capacitor; and
    a pulse width modulation (PWM) signal generator generating a PWM signal for controlling a first switch, among the plurality of switches, by comparing a SAW signal generated based on the ramp signal with the error signal.

2. The controller of claim 1, wherein the plurality of switches are connected in series, an inductor is connected to a center node of the plurality of switches, and the flying capacitor is connected in parallel to two switches adjacent to the center node.

3. The controller of claim 2, wherein the first voltage is a voltage obtained by sensing the output voltage by 0.5 times, and the second voltage is a voltage obtained by sensing the voltage of the flying capacitor by 1 time.

4. The controller of claim 2, wherein the first switch is a switch located between a negative terminal of the flying capacitor and a ground, and
wherein the ramp signal adjuster lowers the slope of the ramp signal when the second voltage is lower than the first voltage.

5. The controller of claim 2, wherein the plurality of switches include the first switch, a second switch, a third switch and a fourth switch that are sequentially arranged, and
wherein the first switch is located between a negative terminal of the flying capacitor and the ground, and the fourth switch is located between a positive terminal of the flying capacitor and the output voltage.

6. The controller of claim 5, wherein the fourth switch is controlled according to an inverted signal of the PWM signal.

7. The controller of claim 2, wherein the SAW signal is generated by combining a current sensing signal corresponding to a current of the inductor and the ramp signal.

8. The controller of claim 1, wherein the ramp signal generator generates the ramp signal using a capacitor and a current source, and
wherein the ramp signal adjuster adjusts the slope of the ramp signal by adjusting an amount of current generated by the current source.

9. The controller of claim 1, wherein the SAW signal is the same signal as the ramp signal.

10. The controller of claim 1, further comprising a gate controller generating a gate signal according to the PWM signal and transmitting the gate signal to a gate of the first switch.

11. The controller of claim 10, wherein the gate controller forms a rising edge of the gate signal according to a set signal and forms a falling edge of the gate signal according to a rising edge of the PWM signal.

12. A power management integrated circuit, comprising:
a first switch, a second switch, a third switch, and a fourth switch included in a multi-level converter and connected in series with each other; and
a controller generating a first ramp signal, adjusting a slope of the first ramp signal according to a difference between a first voltage proportional to an output voltage of the multi-level converter and a second voltage proportional to a voltage of a flying capacitor, and generating a first pulse width modulation (PWM) signal for controlling the first switch according to a first SAW signal generated based on the first ramp signal.

13. The power management integrated circuit of claim 12, wherein the first switch is located between a negative terminal of the flying capacitor and a ground, the fourth switch is located between a positive terminal of the flying capacitor and the output voltage, and the flying capacitor is connected in parallel with the second switch and the third switch.

14. The power management integrated circuit of claim 13, wherein the fourth switch is controlled according to an inverted signal of the first PWM signal.

15. The power management integrated circuit of claim 13, wherein the controller generates a second ramp signal having a phase difference of 180 degrees from the first ramp signal, adjusts a slope of the second ramp signal according to the difference between the first voltage and the second voltage, and generates a second PWM signal for controlling the second switch according to a second SAW signal generated based on the second ramp signal.

16. The power management integrated circuit of claim 15, wherein the controller lowers the slope of the first ramp signal and increases the slope of the second ramp signal when the first voltage is greater than the second voltage.

17. The power management integrated circuit of claim 15, wherein the fourth switch is controlled according to an inverted signal of the first PWM signal, and the third switch is controlled according to an inverted signal of the second PWM signal.

18. A controller for a multi-level converter, comprising:
an error signal generator generating an error signal according to a difference between a feedback voltage proportional to an output voltage of the multi-level converter including a plurality of switches and a reference voltage;
a ramp signal generator generating a ramp signal;
a ramp signal adjuster adjusting a slope of the ramp signal according to a difference between a first voltage proportional to an input voltage of the multi-level converter and a second voltage proportional to a voltage of a flying capacitor; and
a pulse width modulation (PWM) signal generator generating a PWM signal for controlling a first switch, among the plurality of switches, by comparing a SAW signal generated based on the ramp signal with the error signal.

19. The controller of claim 18, wherein the plurality of switches are connected in series, an inductor is connected to a center node of the plurality of switches, the flying capacitor is connected in parallel to two switches adjacent to the center node, a ground voltage is supplied to one side of the plurality of switches, and the input voltage is supplied to the other side of the plurality of switches.

20. The controller of claim 18, wherein the first voltage is a voltage obtained by sensing the input voltage by 0.5 times, and the second voltage is a voltage obtained by sensing a voltage of the flying capacitor by 1 time.

* * * * *